(12) United States Patent
Lewis, Jr. et al.

(10) Patent No.: US 8,353,473 B2
(45) Date of Patent: Jan. 15, 2013

(54) SCRAP MATERIAL SHREDDING AND COMPRESSING APPARATUS AND SYSTEM

(76) Inventors: James L. Lewis, Jr., Calabash, NC (US); James L. Lewis, Sr., Calabash, NC (US)

(*) Notice: Subject to any disclaimer, the term of this patent is extended or adjusted under 35 U.S.C. 154(b) by 0 days.

(21) Appl. No.: 13/183,752

(22) Filed: Jul. 15, 2011

(65) Prior Publication Data

US 2011/0272513 A1 Nov. 10, 2011

Related U.S. Application Data

(63) Continuation-in-part of application No. 12/284,052, filed on Sep. 18, 2008, now Pat. No. 8,002,211.

(51) Int. Cl.
*B02C 13/286* (2006.01)

(52) U.S. Cl. ............... 241/101.4; 241/186.2; 241/189.1; 241/194

(58) Field of Classification Search ............... 241/189.1, 241/194, 195, 186.2, 186.35, 101.4
See application file for complete search history.

(56) References Cited

U.S. PATENT DOCUMENTS

| | | | |
|---|---|---|---|
| 2,594,583 A * | 4/1952 | Richardson | 241/55 |
| 3,103,163 A | 9/1963 | Gates | |
| 3,934,499 A | 1/1976 | Strom | |
| 4,046,325 A * | 9/1977 | Tucsok et al. | 241/73 |
| 4,374,573 A | 2/1983 | Rouse et al. | |
| 4,504,019 A | 3/1985 | Newell et al. | |
| 4,720,051 A * | 1/1988 | Graveman et al. | 241/186.3 |
| 4,834,302 A * | 5/1989 | Baker | 241/92 |
| 4,993,649 A | 2/1991 | Koenig | |
| 5,213,686 A | 5/1993 | Funk et al. | |
| 5,645,234 A | 7/1997 | Del Zotto | |
| 5,727,741 A * | 3/1998 | Gibson | 241/157 |
| 5,996,913 A | 12/1999 | van der Beek et al. | |

OTHER PUBLICATIONS www.sierraintl.com.
www.rossmach.com.
"Recycling Today", trade publication, May 2007.
www.metso.com.
http://metprointernational.com.

* cited by examiner

*Primary Examiner* — Mark Rosenbaum
(74) *Attorney, Agent, or Firm* — P. Jeff Martin; The Law Firm of P. Jeffrey Martin, LLC

(57) ABSTRACT

A scrap material recycling apparatus includes a feeder, a shredder and a separator, the feeder and the shredder mutually coupled, and the shredder and separator mutually coupled. The feeder includes a means for compressing a quantity of scrap material and means for advancing the scrap material to the shredder. The shredder includes a grate assembly and a rotor, the rotor having a plurality of cutting means, the rotor mechanically rotated to reduce the scrap material. The separator separates the reduced scrap material by fractional composition. The recycling apparatus may be configured so as to be a transportable system, thereby allowing such system to be relocated at or near scrap material stockpile locations.

6 Claims, 7 Drawing Sheets

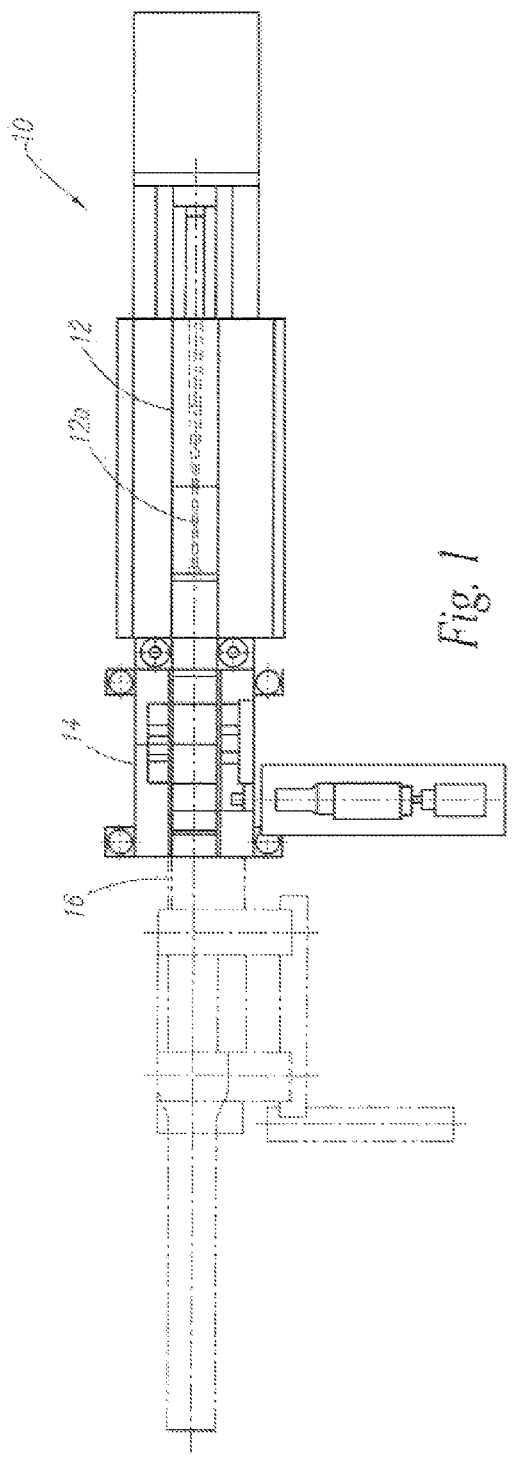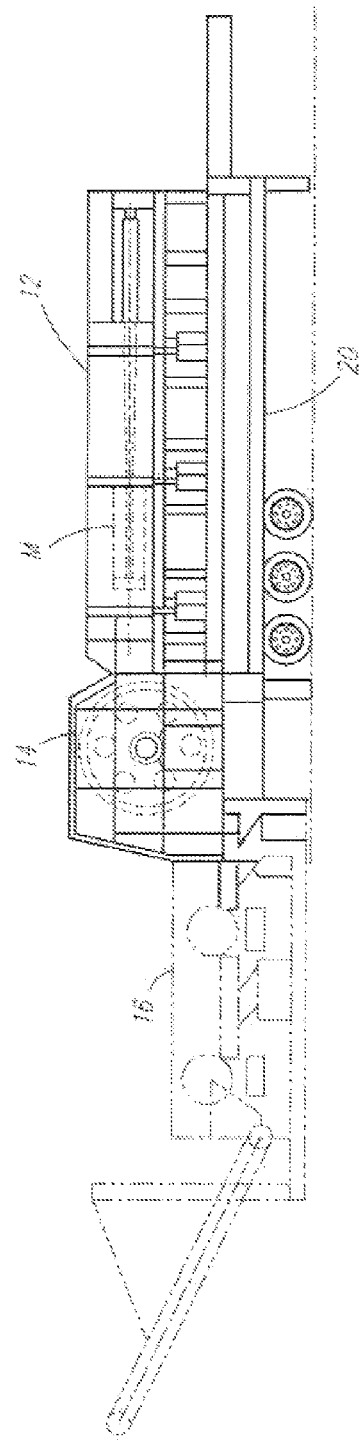

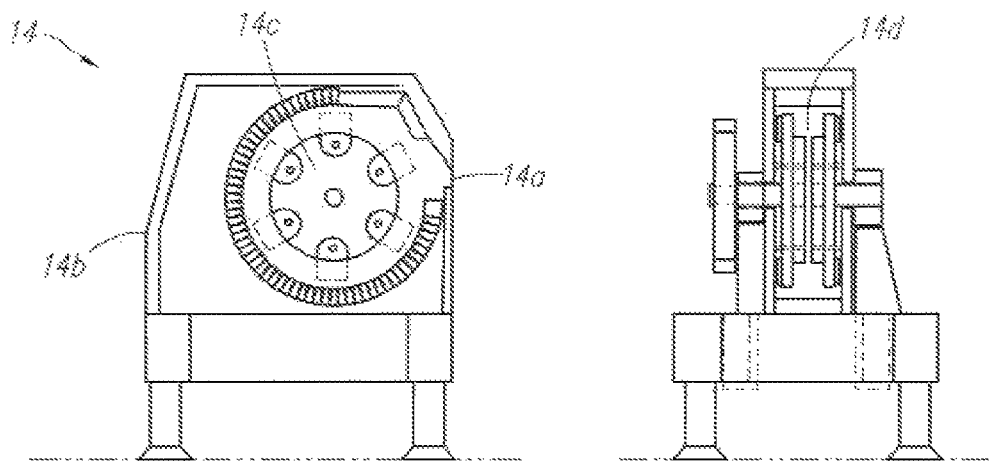
Fig. 3
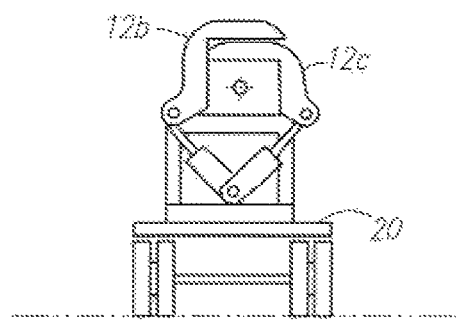
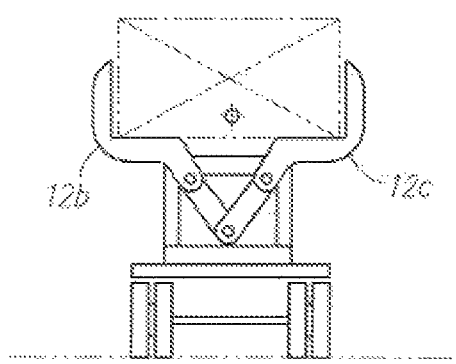
Fig. 4

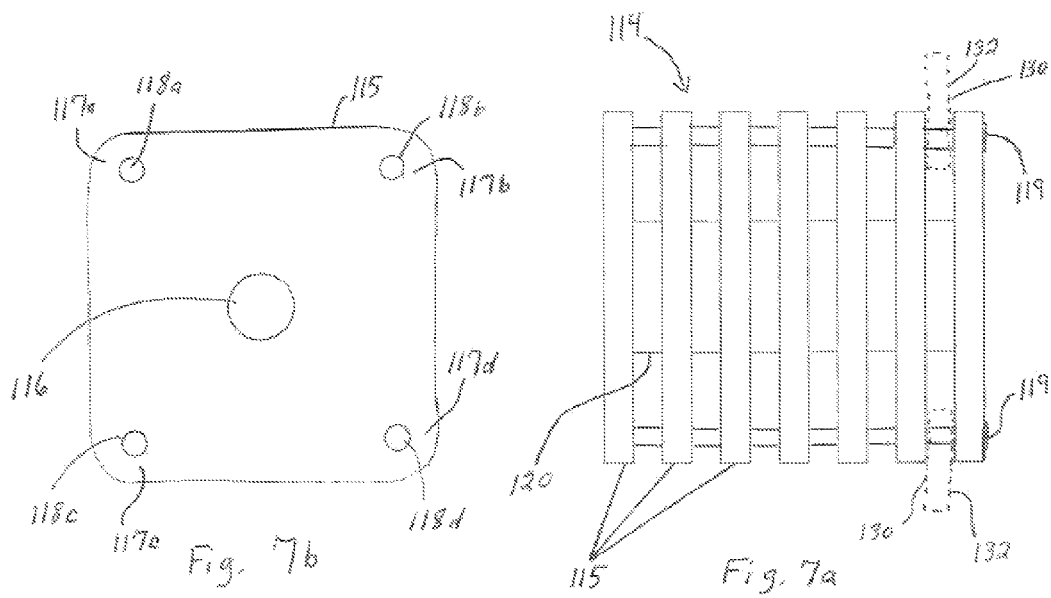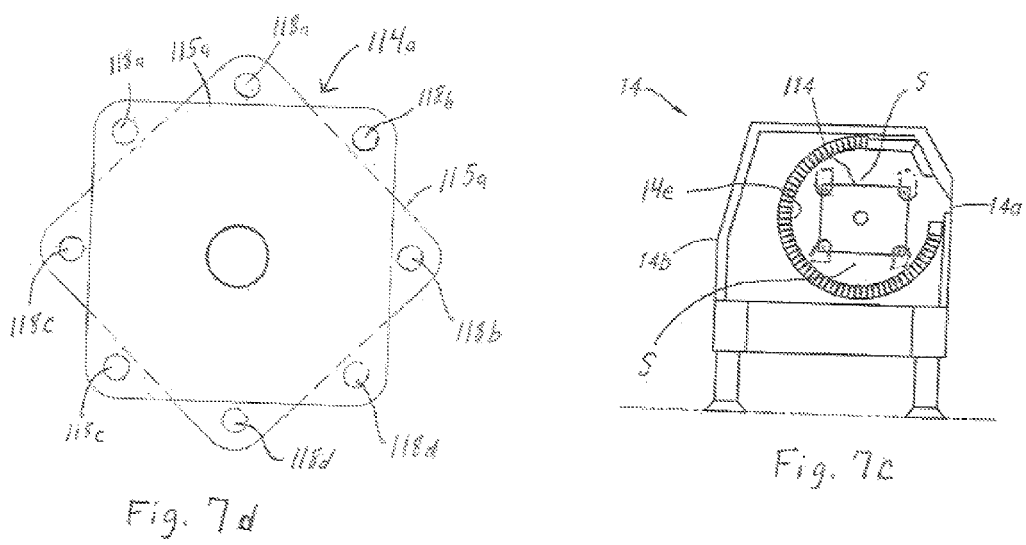

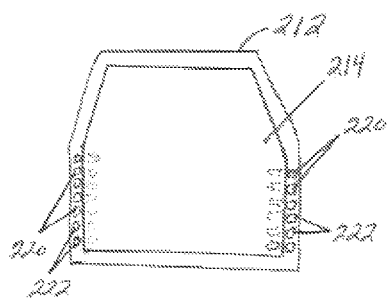
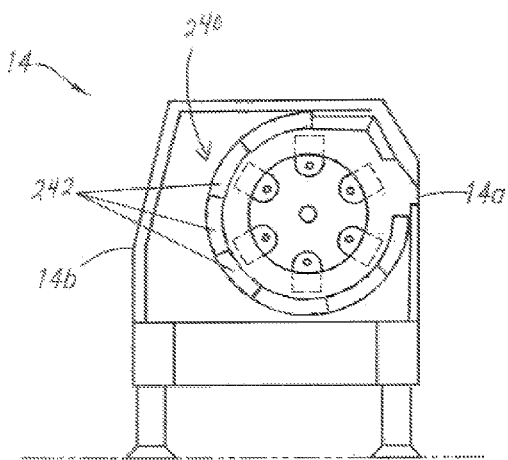
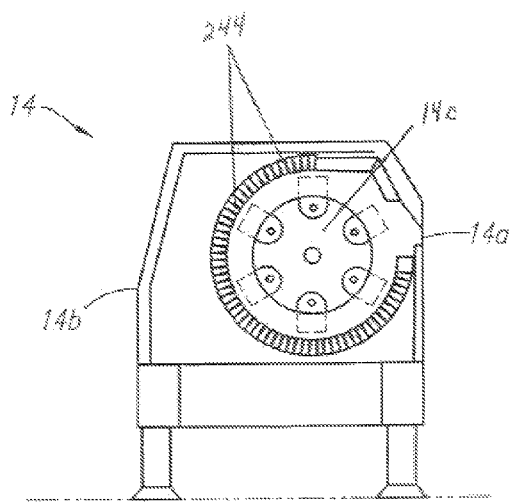
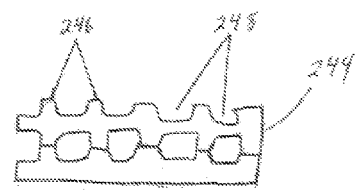
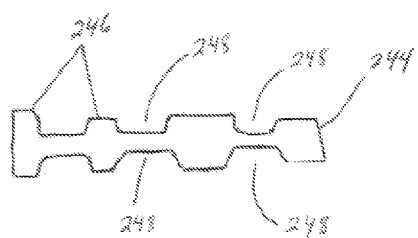
Fig. 10
Fig. 9a
Fig. 9b
Fig. 9c
Fig. 9d

SCRAP MATERIAL SHREDDING AND COMPRESSING APPARATUS AND SYSTEM

RELATED APPLICATIONS

The present invention is a Continuation-in-Part of application Ser. No. 12/284,052, filed on Sep. 18, 2008 now U.S. Pat. No. 8,002,211.

BACKGROUND OF THE INVENTION

1. Field of the Invention

The present invention relates generally to compressing and fragmentizing apparatuses utilized in converting scrap material into reusable material. In particular, the present invention relates to an improved fragmentizing and compressing apparatus and system that compresses, shreds, separates, and discharges the converted scrap material, and which may provide that the apparatus(es) and/or system is mobile or transportable from one location to another.

2. Description of the Related Art

Presently, the convergence of cost savings and environmental sensitivity has generated a demand for apparatuses and systems that can more economically recycle material previously recycled in other ways or were discarded to a landfill. In particular, scrap material resulting from the use of metal, plastic, rubber, glass, ceramic, wood or other similarly used material, has emerged as a valuable commodity as a means for extracting optimal consumption from a particular quantity of material. In optimizing consumption throughout the production and use cycle, manufacturers and consumers alike may realize long-term costs savings in reducing the need for purchasing new or virgin replacement materials, reducing raw material costs and in minimizing waste disposal costs. Additionally, the disposal of such materials may require special efforts or permits compliant with environmental laws and/or regulations. A further optimization of the consumption cycle is realized in the reduction of transportation costs afforded by the invention and its capability to be located at or near the scrap stock site, eliminating a haulage step from the recycling process.

The aforementioned concerns are particularly acute with metal materials, including but not limited to steel, iron, copper, brass, nickel, and aluminum, which are becoming increasingly expensive to purchase and utilize in a manufacturing process. The utilization of the disclosed apparatus(es) and/or system provides a means for reducing excess scrap stock (at the manufacturer, consumer, and waste-disposal level) by compressing and shredding the material into scrap feedstock that is further separable by size and/or composition, if desired. Of particular interest, the invention may be arranged and housed in such a manner as to be mobile or transportable to a site possessing excessive amounts of scrap material that might otherwise be more costly and/or difficult to recycle than what can be achieved by the apparatus(es) and system disclosed herein.

Thus far, the applicant is unaware of any apparatus, device, system or method which disclose the elements of the apparatus(es) and/or system disclosed herein. To date, the prior art discloses a variety of apparatuses and systems that attempt to recycle scrap material in an efficient and convenient manner, including compression apparatus and shredding systems.

However, the present invention provides an improvement over the arrangement, operation and results of the prior art in this field of endeavor. To those skilled in the art, it is well known that a compression apparatus is often coupled to a cutting apparatus (commonly referred as a shear) to reduce the compressed materials into a usable size fraction for metals melting. A limitation of this art is that commingled materials, such as occur in obsolete (end-of-life) durable goods, for example, automobiles, appliances, and the like, remain commingled in a state requiring further, often costly, reduction to separate the materials into acceptably pure fractions. Also well known to those skilled in the art, shredders or pulverizers are used to reduce commingled materials to a size fraction that permits the separation of the commingled materials into acceptably pure fractions. A limitation of this art is that large scale obsolete materials require a shredder size sufficient to receive the materials, such as, for example, an obsolete automobile. The shredder size required in such cases is limited to large scale, high throughput, permanently installed machinery, typically located in metropolitan areas where collected material must be hauled some distance to the operation. Such haulage of collected material becomes less profitable as fuel costs escalate. The economic scale presented by this size requirement creates further limitations to cost reductions through the larger operation and maintenance cost of the business.

The invention disclosed herein overcomes the aforementioned limitations by providing the means to shred or fragmentize said materials, such as obsolete automobiles, by first compressing the materials into a compact form that is then fed directly to a small size shredder which reduces the compressed material to the desired size for later separation into desirable fractions. This apparatus, because of its considerably smaller size, may be mounted on a mobile structure, such as a trailer, or on a road-transportable skid such that the recycling process can be located wherever said recyclable materials may be stocked. In this manner, a haulage step is eliminated from the recycling process and the scale of operational cost is reduced.

A search of the prior art did not disclose any patents that read directly on the claims of the instant invention; however, the following references were considered related:

U.S. Pat. No. 4,993,649, issued in the name of Koenig;
U.S. Pat. No. 5,213,686, issued in the name of Funk et al.;
U.S. Pat. No. 4,374,573, issued in the name of Rouse et al.;
U.S. Pat. No. 3,934,499, issued in the name of Strom;
U.S. Pat. No. 3,103,163, issued in the name of Gates;
U.S. Pat. No. 5,996,913, issued in the name of van der Beek et al.;
U.S. Pat. No. 4,504,019, issued in the name of Newell et al.; and
U.S. Pat. No. 5,645,234, issued in the name of Del Zotto.

SUMMARY OF THE INVENTION

In one aspect of the disclosed embodiments, a scrap material recycling apparatus comprises a feeder, a shredder and a separator, the feeder and the shredder mutually coupled, and the shredder and separator mutually coupled. The feeder comprises a means for compressing a quantity of scrap material and means for advancing the scrap material to the shredder. The shredder comprises a rotor having a plurality of cutting means, such as teeth, knives, or hammers, wherein the rotor mechanically rotates to reduce the scrap material. The separator sorts the reduced scrap material by fractional composition.

In accordance with the aforementioned embodiment, and other envisioned combinations of embodiments, the compression means may comprise a pair of arms that are inwardly biased. The arms may comprise means for actuating movement of the arms between opened and closed positions, wherein actuating means may comprise mechanical cylinders, including hydraulic, pneumatic or other types of cylinders, or other means for actuating arm motion. The arms or other compression means impart high compressive force compressing the scrap material for transfer to the shredder.

In accordance with the aforementioned embodiment, and other envisioned combinations of embodiments, advancing means may comprise a telescoping ram cylinder, a toothed feed roll, or a conveyor, among several possibilities, for advancing the scrap material from the feeder to the shredder.

In accordance with the aforementioned embodiment, and other envisioned combinations of embodiments, the shredder may comprise an inlet and an outlet mutually opposed, the inlet receiving scrap material from the feeder, and the outlet delivering scrap material to the separator. The separator may comprise an electromagnetic means, such as at least one magnet or an eddy current device, a pneumatic means, such as an air classifier, a fluid bed, or a destoner, or a mechanical means, such as a splitter chute, a roller screen, or a vibratory screen for separating shredded materials into fractional compositions, such as ferrous, non-ferrous, and non-metallic materials.

In another aspect of the disclosed embodiments, a system for processing scrap material is disclosed, the system comprises a compressing apparatus compressing scrap material, a shredding apparatus having means for shredding the scrap material, means for advancing the scrap material from the compressing apparatus to the shredding apparatus, a discharge apparatus; means for separating shredded materials into fractional compositions in preparation for discharge of the scrap materials, and means for advancing the scrap material from the shredding apparatus to the discharge apparatus.

In accordance with this and other envisioned embodiments and combinations of embodiments, advancing means may comprise a telescoping ram cylinder, a toothed feed roll or a conveyor.

In accordance with this and other envisioned embodiments and combinations of embodiments, the separator may comprise at least one magnet, an eddy current device, an air separator, a mechanical separator, or a combination of one or more of these elements, for separating shredded materials into fractional compositions.

In another aspect of the disclosed embodiments, a system for processing scrap material is disclosed, the system comprises a power plant for providing power to the system and the constituent elements, a feeder apparatus compressing the scrap material for shredding, at least one metal shredder, means for conveying the scrap material from the feeder apparatus to the metal shredder, at least one discharge conveyor for advancing the scrap material from the shredder to a separation area, and means for separating shredded materials into fractional compositions.

The system may further comprise at least one residue conveyor for non-metallic residue, or at least one stacking conveyor, or at least one dust extraction means, separately or in combination within the disclosed system(s). The system may further comprise a plurality of controls for operating the system, including separate operational controls for each element and each constituent sub-element of the disclosed elements.

The system may further comprise separating means comprising one or more electromagnetic devices, or a pneumatic separator, or a mechanical separator, or a combination of these elements.

It is envisioned that each of the embodiments disclosed, including the apparatus and/or system(s) may be placed on or formed as an integral unit of a transportable apparatus, such as a flat bed trailer or other similar device suitable for housing and transporting such an apparatus or system.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 1 is a plan view of the apparatus and system for shredding and compressing scrap material;

FIG. 2 is an elevation view of the FIG. 1;

FIG. 3 is a section view of the shredder of FIG. 2;

FIG. 4 is a section view of the feeder and elements of FIG. 2;

FIG. 7a is a side elevational view of a rotor, in accordance to one embodiment of the present invention;

FIG. 7b is a top plan view of a plate of a rotor, in accordance to one embodiment of the present invention;

FIG. 7c is a section view of the shredder of illustrating a rotor having a series of plates axially aligned, according to one embodiment of the present invention;

FIG. 7d is a top plan view of a rotor, in accordance to an alternate embodiment of the present invention;

FIG. 9a is a side section view of a grate assembly illustrating a series of grate brackets thereof, in accordance to one embodiment of the present invention;

FIG. 9b is a side section view of the grate assembly of FIG. 9a showing a plurality of grate bars detachably mounted inside corresponding grate brackets, in accordance to one embodiment of the present invention;

FIGS. 9c-9d are side elevational views depicting grate bars;

FIG. 10 is a side section view of a plurality of fingers disposed within finger receiving cavities of the feeder, in accordance to one embodiment of the present invention.

DESCRIPTION OF THE PREFERRED EMBODIMENT

Detailed Description of the Figures

Figure 5A:
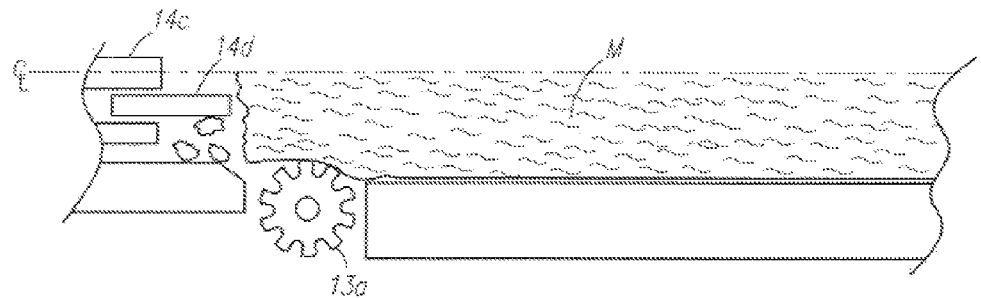
FIG. 5A is top plan view of a toothed feed roll.
Figure 5B:
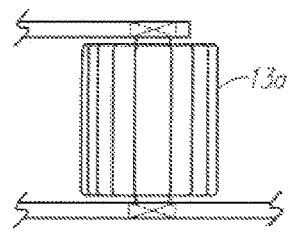
FIG. 5B is a partial side elevational view of the toothed feed roll of FIG. 5A.
Figure 6A:
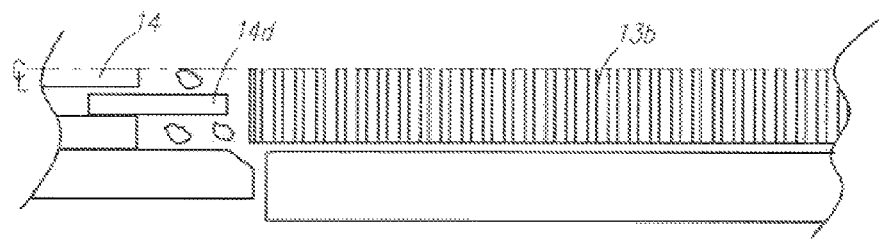
FIG. 6A is a top plan view of a metal track conveyor.
Figure 6B:
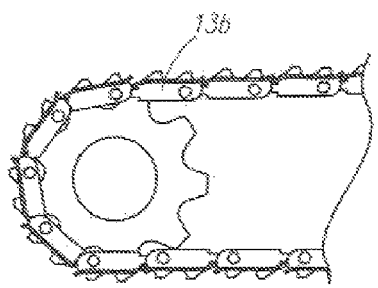
FIG. 6B is a partial side elevational view of the metal track conveyor of FIG. 6A.

Referring now to FIG. 1 through FIG. 6B, an apparatus for shredding and/or compressing scrap material into a recyclable and reusable feedstock source that may be utilized as a separate device or in combination with a larger system for reducing scrap material M is disclosed. As disclosed, the apparatus 10 generally comprises a feeder 12, a shredder 14 and a separator 16. The feeder 12 and the shredder 14 are mutually coupled to one another, and the shredder 14 and the separator 16 are mutually coupled to one another. The feeder 12 provides a collection point for the various materials M to be recycled, and further provides compression of the material into a size suitable to be fed into the shredder 14. The compressed scrap material M advances from the feeder 12 to the shredder 14, which shreds and/or grinds the material M into smaller portions. The reduced material M then advances from the shredder 14 to the separator 16, which separates the material M into its fractional composition(s) for collection or categorizing.

Generally, the feeder 12 advances the scrap material M into the shredder 14 for reduction via a mechanism such as a telescoping ram cylinder 12a (shown as the preferred embodiment), a toothed feed roll (13a), or metal track conveyor (13b). The feeder 12 further includes a compressing means for compressing a quantity of scrap material M, the compressing means compresses bidirectionally. The compressing means comprises a plurality of arms, which are further divided into pairs of arms 12b and 12c, each arm hydraulically actuated to accommodate the particular desired dimension of the material M inserted into the feeder. The arms 12b and 12c may be opened or closed through actuation, and in the "open" position, the arms 12b and 12c serve as the collection point for the materials to be compressed and then shredded. As depicted in FIG. 2 and FIG. 4, the arms 12b and 12c are inwardly biased so as to create a desired shape and dimension of material after compression. Further, the arms 12b and 12c are actuated, preferably by hydraulic cylinders, but may be actuated by other motive means, so as to provide high compressive force that compacts the collected material into the desired shape and dimension. After compression, the arms 12b and 12c remain in a "closed" position to generally conform to the shape and dimension of the material M, providing stability and resistance against the material M as it advances to the shredder 14.

Compression of materials M allows achievement of a greater efficiency of scale in that a smaller shredder may be used to achieve a cutting intensity equal to larger machines and lower machinery and operating costs are realized.

As depicted in FIG. 1 and FIG. 3, the shredder 14 has an inlet 14a and an outlet 14b, and a rotor 14c with a plurality of hammers 14d or teeth intermediately disposed between the inlet 14a and outlet 14b, wherein hammers 14d being free to swing with respect to the rotor 14c. The rotor 14c is mechanically rotated so that the hammers 14d engage the material M and shred or grind the material M into smaller and more manageable portions for discharge to the separator 16. The rotor 14c defines a diameter having a greater measure than a width of rotor 14c, thereby allowing for a higher cutting force. In addition, the rotor 14c having a width with a smaller measure than its diameter reduces cost energy usage, but requires the use of a compression feature.

The separator 16 may comprise a variety of devices and techniques for separating the reduced material M, including but not limited to the use of an electromagnetic means, such as at least one magnet or an eddy current device, a pneumatic means, such as an air classifier, a fluid bed, or a destoner, and/or a mechanical means, such as a splitter chute, a roller screen, a vibratory screen, a ferrous stacking conveyor, or a mixed nonferrous collection means. Particularly with the use of magnet(s) separators or eddy current separators, the fractional compositions produced usually result in a clean ferrous (iron/steel) fraction of approximately 80%, a mixed nonferrous metal fraction of approximately 5%, and a mixed non-metallic fraction comprising the remainder of the quantity fraction. One feature and advantage provided by the apparatus 10 is to generate a more pure reduced material M that permits an end-user consumer (manufacturer) to utilize the reduced material M that has fewer impurities than similar reduced material M generated by existing and less satisfactory reduction methods. The apparatus 10 provides the separation means in a compact transportable fashion matched in capacity to the upstream compression and shredding apparatus. In this manner, the ability to shred and separate, for example an obsolete automobile is now provided in a compact system with lower operation and maintenance costs than the state of the art, which is limited by aforementioned feeding size requirements to large-scale permanently installed operations.

As previously disclosed, another feature and advantage to the apparatus and system is the adaptability of the apparatus and system for configuration onto a mobile or transportable unit 20. It is envisioned that such a unit or units may comprise any of a variety of multi-axle semi-trailer hauled beds, including a flatbed, an extendable flatbed, a drop deck and double drop deck (extendable), a low boy, a tank trailer, a dolly trailer, a trunnion axle trailer, a platform trailer, and a 9-axle, 13-axle, or a 19-axle trailer, and other similarly suitable hauling trailers capable of supporting such an apparatus or system combination as described above.

A system for shredding and compressing scrap material M is envisioned, the system comprising at least a shredding (hammer-mill) apparatus, a compressing apparatus, and a discharge apparatus consistent with the elements disclosed above with regard to the apparatus, with the system wholly or partially mounted to one of the mobile or transportable units described above. The system may be more particularly described as comprising an engine driven power plant, including a motor or hydraulic drive, a feed system, at least one metal shredder, at least one discharge conveyor, at least one residue conveyor, at least one stacking conveyor, a magnet separator system, dust extraction means, and a plurality of controls for operating the system. The power plant is operatively coupled to the elements of the system requiring direct powered input for operation. The feed system is substantially similar to the feeder described above, with variations envisioned to accommodate size requirements or restraints. Once the material M has been reduced by the metal shredder, a discharge conveyor may transport the material M from the shredder to the separator, wherein, for example, a magnet and/or air separator separates the material into various fractions. The residue conveyor will transport the fractions to various stations as provided in the particular configuration (set up to accommodate the specific material(s) reduced).

Further separation means may be used on the residue stream, including but not limited to eddy-current separation, air separation, or other means as may be warranted by the materials being processed. One or more stacking conveyors are engaged thereafter to stack the material M as desired. Alternatively, separators may discharge directly into receiving means, such as hoppers, bins, and the like. A dust extraction means is incorporated into the system to eliminate any excessive dust generated in the reduction of the material M, and may be incorporated at one of several points in the process utilized within the system, and may further include multiple dust extraction means if the reduction is particularly prone to multiple areas of excessive dust generation. A plurality of controls may be provided to extend control over various elements of the system and over various phases of the process used within the system.

By way of example only, there are at least two envisioned embodiments encompassing the mobility or transportability of the system described above, with special interest in the area of pulverizing automobile material, such as in a junkyard. For the sake of labeling only, the at least two embodiments are labeled as a "mobile system" and a "portable system", though other suitable labels may be used and substituted without limitation to the scope of the invention or the claims.

In a "mobile system", it is envisioned that the mobile system would be capable of shredding/grinding/pulverizing approximately 6-10 automobiles per hours, or approximately 80-100 tons of material per day. In one embodiment of the mobile system, a reliable diesel engine power unit is provided to power aspects of the system. The mobile system is intended to provide mobility via the various trailers described above, with a relatively simple set-up for use, and configured to avoid the need for special transportation permits on the highways or other roads.

Alternately, in a "portable system", it is envisioned that the portable system would be capable of shredding/grinding/pulverizing approximately 20 automobiles per hour, or approximately 200 tons of material per day. The system may be operated with an engine or electric motor driven power unit. A skid mounted platform may be utilized, while providing the transportability desired, although special transportation permits may be required for moving from one location to another, due to the system's weight and size.

Referring now to FIGS. 7a-7c, in accordance to one preferred embodiment, an improved rotor 114 having a plurality of cutting means 130, such as teeth, knives, or hammers 132, is disclosed. Rotor 114 comprises a series of plates 115 axially joined spatially along a shaft 120, the shaft 120 providing common rotation and support for the series of plates 115. More specifically, the series of plates 115 each having a centralized shaft receiving hole 116 through which the shaft 120 is received and mounted. The series of plates 115 each define a square, planar configuration and are spatially aligned in parallel orientation with respect to one another, as illustrated in FIG. 7a. The square-shaped configuration defining the plates 115 imparts functional utility and advantages over conventional round rotors. Particularly, during rotation of the rotor 114, a space S or pocket opens between the rotor perimeter P and the shredder casing 14e after each successive cutting means 130 swing, thereby providing a retaining space for difficult or unshreddable items to travel within until further shredding or removal can be effected. The space S advantage provided by the rotor 114 design of the apparatus 10 of the present invention obviates the need for unshreddable material egress doors (not shown) required by prior art compression apparatus and shredding systems.

The square-shaped configuration defining the plates 115 also provides advantages over spider rotors (not shown). Spider rotors comprise a series of parallel bars or splines arranged along a shaft in alternating perpendicular positions. An advantage provided by the rotor 114 of the present invention over spider rotors is the square-shaped configuration of the rotor's 114 plates 115 intrinsically possesses greater material strength than a material strength possessed by spider rotors, thereby affording rotor 114 with enhanced resistance to bending, impact, torque and other stresses created by the mechanical operation of the apparatus 10 of the present invention.

Each corner 117a-117d of each plate 115 of the series of plates 115 includes a hole 118a-118d, respectively, defined therethrough, the holes 118a-118d adapted for supporting a pin 119 therethrough. The pin 119 engages at least two plates 115 to provide cutting means 130 swing positions or rows, the pin 119 securing the cutting means 130 to the plates 115, and wherein cutting means 130, shown herein as hammers 132, being free to swing with respect to the rotor 114.

As shown in FIG. 7a, being spatially aligned in parallel orientation, the series of plates 115 provide four cutting means 130 swing positions or rows, the number of rows being equal to the number of holes 118a-118d viewable when viewing rotor 114 from one end thereof. One or more of the holes 118a-118d may be utilized for supporting hammers 132, wherein the number of holes 118a-118d or rows selected by user being dependent upon the material M being fragmented, and other operational characteristics, such as cutting size, rotor speed, and the like.

In reference to FIG. 7d, in accordance to an alternate rotor 114a embodiment, rotor 114a comprises a series of plates 115a axially joined spatially along a shaft 120, the shaft 120 providing common rotation and support for the series of plates 115a. The series of plates 115a each define a square, planar configuration and are spatially aligned and oriented such that every other plate 115a is positioned approximately 45° with respect to plate(s) 115a adjacent thereto. In this arrangement, the series of plates 115a provide eight cutting means 130 swing positions or rows, when viewing rotor 114a from one end thereof, as illustrated in FIG. 7d. The design and configuration of rotor 114a allows for the number of cutting means 130 swing rows to increase to eight, thereby allowing for a greater number of cutting means 130 or hammers 132 to be supported by the rotor 114a, and in turn, facilitating fragmentation of less resilient materials M to a finer cut size.

In addition, rotors 114 and 114a may be constructed at lower cost than conventional round rotors, or rotors employing round plates or bars. Thus, rotors 114 and 114a provide a more cost-efficient use of construction material to accomplish the mutual goal of shredding and compressing scrap material M.

Figure 8A:
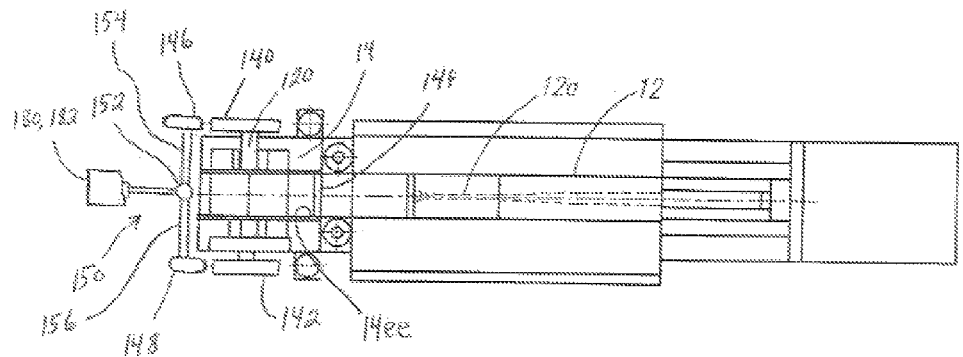
FIG. 8a is a plan view of the apparatus and system illustrating a pair of flywheels, in accordance to one embodiment of the present invention.
Figure 8B:
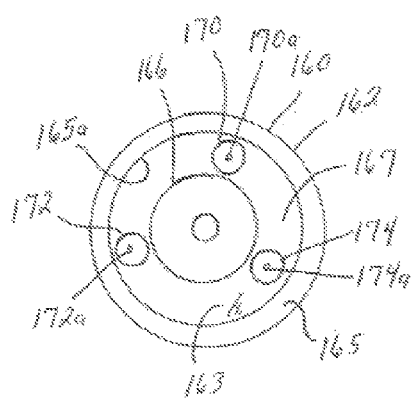
FIG. 8b is a top plan view of a flywheel, in accordance to an alternate embodiment of the present invention.

Referring now to FIGS. 8a-8b, in order to add rotational inertia to the shredder 14 for purposes of minimizing rotational speed fluctuations during operation thereof, at least one flywheel 140 is provided. In particular reference to FIG. 8a, two flywheels 140, 142 are provided, wherein the flywheels 140, 142 are mounted to respective ends of shaft 120. The two flywheels 140, 142 are engaged by two corresponding pneumatic, rubber wheels 146, 148 or tires, respectively. The wheels 146, 148 are rotatably driven by a drive train 150 comprising a differential 152 having opposing drive shafts 154, 156, wherein each shaft 154, 156 of the opposing drive shafts 154, 156, independently drives one of the rubber wheels 146, 148. The differential 152 is driven or powered via a power source 180, such as an engine 182, a tractor power take-off shaft (PTO) (not shown), and the like. The wheels 146, 148 are configured and positioned so as to impart sufficient contact force with the flywheels 140, 142, thereby ensuring suitable power transmission from wheels 146, 148 to flywheels 140, 142. The flywheels 140, 142 and the rubber wheels 146, 148 define a diameter sufficient to provide clearance of the shredder housing.

Power applied to each end of the rotor 114, 114a balances the torque therein, and provides a friction drive mechanism which can act as a slip joint should a catastrophic event cause the rotor 114, 114a of shredder 14 to immediately stop rotation. Such advantages help protect the drive train 150 in the event of stoppage or excessive torque events; otherwise, such excessive torque would transfer to the drive train 150 and cause further damage.

Figure 8C:
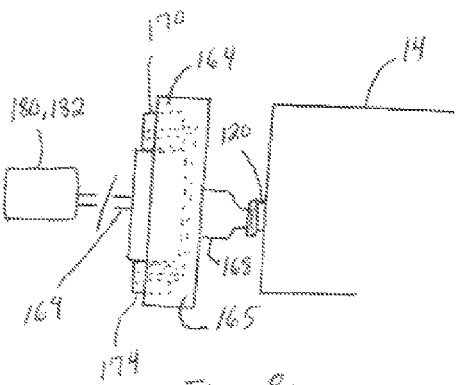
FIG. 8c is a side elevational view of the flywheel of FIG. 8b shown in-use.

Referring now more specifically to FIGS. 8b-8c, a flywheel 160 is mounted to one end of the shaft 120. The flywheel 160 comprises a large diameter cylinder 162 comprising a circular floor 163 from which a sidewall 164 extends upwardly there-from forming a circular vertical perimeter 165 therearound. The flywheel 160 further comprises a pneumatic drive wheel 166 positioned centrally to perimeter 165, the wheel 166 extending through an opening in floor 163 and being mounted via a connecting shaft 168 to one end of the shaft 120 of rotor 114, 114*a*, the pneumatic drive wheel 166 being inflatable. The pneumatic drive wheel 166 is rotatably driven by a drive shaft 169, wherein drive shaft 169 is driven or powered via a power source 180, such as an engine 182, a PTO, and the like. An interior volume 167 is provided between an inner circumferential surface 165*a* of perimeter 165 and the pneumatic drive wheel 166.

A series of friction drive wheels 170, 172, 174, preferably at least three friction drive wheels 170, 172, 174, are disposed spatially equidistant about the pneumatic drive wheel 166, within the interior volume 167. The friction drive wheels 170, 172, 174 are disposed so as to allow contact with the inner circumferential surface 165*a*. The friction drive wheels 170, 172, and 174 each being independently supported by and rotatable about a respective semi-flexible base 170*a*, 172*a*, and 174*a*. Upon being inflated, the pneumatic drive wheel 166 engages the friction drive wheels 170, 172, 174 and urges wheels 170, 172, 174 radially against the inner circumferential surface 165*a* of the perimeter 165 of cylinder 162. As the pneumatic drive wheel 166 rotates, the friction drive wheels 170, 172, 174 counter-rotate (rotate in an opposite direction with respect to pneumatic wheel 166), thereby causing the flywheel 160 to rotate, and in turn, causing rotor 114, 114*a* to rotate. Typically, the diameters of the friction drive wheels 170, 172, 174 may be designed to provide a speed reduction from the motive source 180, 182 to the rotor 114, 114*a* similar to planetary gear reducers. This arrangement has the advantage of being more compact than the above-described two flywheels 140, 142 embodiment, although more complex to construct. In addition, this arrangement allows for the main axes of rotation to be parallel to the rotor 114, 114*a* of shredder 14 which overcomes and resolves the shaft bending component which is inherent when driving a shaft by friction means from the side or from a lateral orientation. As opposed to a typical gear reducer, the transmission of power, in accordance to the embodiments of the present invention described hereinabove, occurs through friction contact surfaces, which allow slippage should the design torque be overcome.

Referring now to FIGS. 9*a*-9*d*, the shredder 14 further comprises a grate assembly 240, wherein grate assembly 240 comprising at least one grate bracket 242 or cartridge, preferably a plurality of grate brackets 242 or cartridges, mounted to an interior sidewall 14*ee* of shredder casing 14*e*. At least one grate bar 244 is engaged within and detachably affixed to the at least one grate bracket 242. As shown herein, a plurality of grate brackets 242 is arranged in series, juxtapositionally, and radially with respect to rotor 14*c*, 114, or 114*a*. The grate brackets 242 may be disposed at any position radially about of rotor 14*c*, 114, or 114*a*, and hence grate bars 244 may be detachably mounted radially about the rotor 14*c*, 114, or 114*a* accordingly. In accordance to this particular embodiment, the grate bar(s) 244 is/are slidably engaged laterally into the bracket(s) 242. In FIG. 9*b*, a plurality of grate bars 244 are shown detachably mounted inside corresponding grate brackets 242. The grate bars 244 may be constructed in various lengths and widths to correspond with respective grate brackets 242 sizes and dimensions, and may be further constructed with various rib 246 designs and voids 248, through which fragmentized material may pass, so as to allow scrap material M to be fragmentized according to size and preference. Thus, grate bars 244 are envisioned to be constructed in a number of designs, all of which intended to be interchangeable with brackets 242. FIGS. 9*c* and 9*d* illustrate grate bars 244 differing in shape and configuration with respect to one another.

Figure 9E:
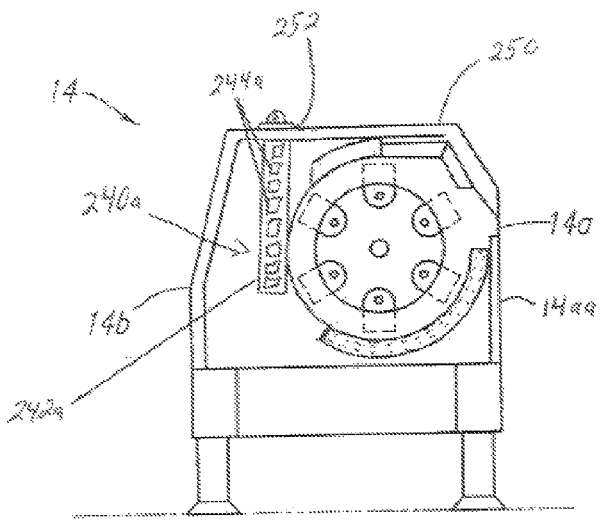
FIG. 9e illustrates an alternate grate assembly embodiment of the present invention.

Referring now to FIG. 9*e*, an alternate embodiment of the present invention is disclosed, wherein grate assembly 240*a*, comprising at least one grate bracket 242*a* or cartridge, preferably a plurality of grate brackets 242*a* or cartridges, mounted longitudinally to an interior sidewall 14*ee* of shredder casing 14*e*. The at least one grate bracket 242 dimensionally extends longitudinally and laterally. At least one grate bar 244*a* is engaged within and detachably affixed to the at least one grate bracket 242*a*. A plurality of grate brackets 242*a* may be provided and arranged in series, juxtapositionally, and appositional with respect to rotor 14*c*, 114, or 114*a*. In accordance to this embodiment, the grate bar(s) 244*a* is/are slidably engaged vertically into the bracket(s) 242 through an opening 252 in a top 250 of the shredder housing 14*aa*. Opening 252 may be provided through the opening of a hinged door or slidable panel.

Referring now to FIG. 10, in order to decrease the advance rate of scrap material M from feeder 12 to shredder 14, a plurality of fingers 220 are disposed within finger receiving cavities 222 formed in the sidewalls 215 of the compression chamber 214 of feeder 12, proximal the shredder opening 14*f*. The fingers 220 are adapted and configured to extend from their respective cavities 222 to frictionally engage scrap material M, thereby providing a holding means for checking the advance of the material M into the shredder opening 14*f*. The fingers 220 are further adapted and configured to retract into their respective cavities 222. Extension and retraction of fingers 220 may be actuated via hydraulics or other suitable mechanical means, wherein selected actuation means being manually or automatically controlled via an operator.

Figure 11A:
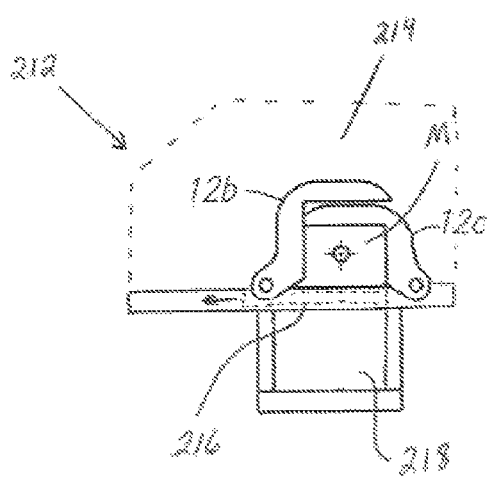
FIGS. 11a-11b are side elevational views of a fixed or openable floor of the feeder, in accordance to another embodiment of the present invention.
Figure 11B:
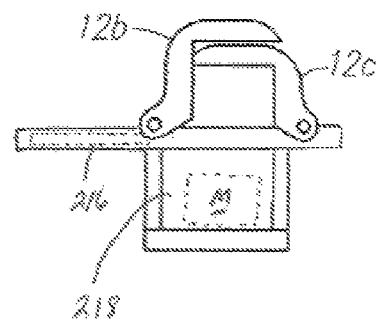

Referring now more specifically to FIGS. 11*a*-11*b*, an improved feeder 212 is disclosed, wherein feeder 212 comprises a compression chamber 214 housing a compressing means for compressing a quantity of scrap material M. The compressing means comprises a plurality of arms, which are further divided into pairs of arms 12*b* and 12*c*, each arm hydraulically actuated to accommodate the particular desired dimension of the material M inserted into the feeder 12. The compressing means compresses the scrap material M bidirectionally (vertical and horizontal). The compression chamber 214 includes a fixed or openable floor 216 positioned below the compressing means, and further includes a feed chamber 218 positioned subjacent to floor 216. In accordance to an embodiment comprising an openable floor 216, once the material M has been compressed via compressing means, the openable floor 216 opens allowing compressed scrap material M to drop and be retained within the feed chamber 218, whereupon openable floor 216 moves to a closed position. Operational control concerning the opening and closing of openable floor 216 may be manual or automated, and actuated via hydraulics or other suitable mechanical means. Movement of door 216 between an open and closed position is shown herein as lateral movement, however, other directional orientations are envisioned, therefore, movement of door 216 as shown and described herein is not intended to be limiting. It is envisioned the openable door 216 may also be operationally controlled and actuated wirelessly via wireless transmitter and receiver (not shown).

It is envisioned that the various embodiments, as separately disclosed, are interchangeable in various aspects, so that elements of one embodiment may be incorporated into one or more of the other embodiments, and that specific positioning of individual elements may necessitate other arrangements not specifically disclosed to accommodate performance requirements or spatial considerations.

It is to be understood that the embodiments and claims are not limited in its application to the details of construction and arrangement of the components set forth in the description and illustrated in the drawings. Rather, the description and the drawings provide examples of the embodiments envisioned, but the claims are limited to the specific embodiments. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the U.S. Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

What is claimed is:

1. A scrap material recycling apparatus comprising:
a feeder; and
a shredder, the feeder and the shredder mutually coupled;
the feeder comprising a compressing means for compressing a quantity of scrap material to a size adapted for being received by an inlet of the shredder, wherein the feeder further comprises a plurality of fingers;
the shredder comprising a rotor having a plurality of cutting means, the rotor mechanically rotated to reduce the scrap material, and wherein the rotor comprises a series of plates axially joined spatially along a shaft, the series of plates each defining a square, planar configuration and the plates are spatially aligned in parallel orientation and such that alternating plates of the series of plates are oriented approximately 45° with respect to plates adjacent thereto.

2. The apparatus of claim 1, wherein the feeder further comprises a fixed or openable floor positioned below the compressing means.

3. The apparatus of claim 1, further comprising a separator, the separator and the shredder mutually coupled.

4. The apparatus of claim 1, wherein the compressing means compresses bidirectionally.

5. A scrap material recycling apparatus comprising:
a feeder; and
a shredder, the feeder and the shredder mutually coupled;
the feeder comprising a compressing means for compressing a quantity of scrap material to a size adapted for being received by an inlet of the shredder, wherein the feeder further comprises a plurality of fingers, wherein the plurality of fingers is disposed within respective finger receiving cavities formed in a sidewalls of a compression chamber of the feeder;
the shredder comprising a rotor having a plurality of cutting means, the rotor mechanically rotated to reduce the scrap material, and wherein the rotor comprises a series of plates axially joined spatially along a shaft, the series of plates each defining a square, planar configuration and the plates are spatially aligned in parallel orientation and such that alternating plates of the series of plates are oriented approximately 45° with respect to plates adjacent thereto.

6. The apparatus of claim 5, wherein the plurality of fingers each extendible from the respective finger receiving cavities to frictionally engage the scrap material, and wherein the plurality of fingers each retractable into the respective finger receiving cavities.

* * * * *